US012650376B2

(12) United States Patent
Mattis et al.

(10) Patent No.: US 12,650,376 B2
(45) Date of Patent: Jun. 9, 2026

(54) WAVEGUIDE WITH CONTROLLED MODE CONFINEMENT FOR ANALYTE INTERACTION AND OPTICAL POWER DELIVERY

(71) Applicant: ORCA Computing Limited, London (GB)

(72) Inventors: Brian Mattis, Austin, TX (US); Taran Huffman, Austin, TX (US)

(73) Assignee: ORCA Computing Limited, London (GB)

( * ) Notice: Subject to any disclaimer, the term of this patent is extended or adjusted under 35 U.S.C. 154(b) by 377 days.

(21) Appl. No.: 18/135,692

(22) Filed: Apr. 17, 2023

(65) Prior Publication Data
US 2023/0333009 A1 Oct. 19, 2023

Related U.S. Application Data

(60) Provisional application No. 63/331,867, filed on Apr. 17, 2022.

(51) Int. Cl.
| | |
|---|---|
| B01L 3/00 | (2006.01) |
| G01N 21/31 | (2006.01) |
| G01N 21/552 | (2014.01) |
| G02B 6/125 | (2006.01) |
| G01N 21/03 | (2006.01) |

(Continued)

(52) U.S. Cl.
CPC ........ *G01N 21/31* (2013.01); *B01L 3/502715* (2013.01); *G01N 21/552* (2013.01); *G02B 6/125* (2013.01); *B01L 2300/0654* (2013.01);

*B01L 2300/168* (2013.01); *G01N 2021/0346* (2013.01); *G01N 21/7703* (2013.01); *G01N 2021/7763* (2013.01); *G01N 2201/06113* (2013.01); *G02B 6/1228* (2013.01)

(58) Field of Classification Search
CPC ....... B01L 3/502715; B01L 2300/0654; B01L 2300/168; G01N 21/31; G01N 21/552; G01N 21/7703; G01N 2021/0346; G01N 2021/7763; G01N 2021/06113; G02B 6/1228; G02B 6/125
See application file for complete search history.

(56) References Cited

U.S. PATENT DOCUMENTS

| | | | | |
|---|---|---|---|---|
| 6,903,815 | B2 * | 6/2005 | Uchiyama | G01N 21/78 385/12 |
| 7,709,808 | B2 * | 5/2010 | Reel | G01N 21/648 250/458.1 |

(Continued)

OTHER PUBLICATIONS

International Search Report and Written Opinion for International Application No. PCT/US23/18855 mailed Jul. 20, 20023, 17 pages.

*Primary Examiner* — Ryan A Lepisto
(74) *Attorney, Agent, or Firm* — Fenwick & West LLP

(57) ABSTRACT

A photonic circuit and electronic device incorporating the same including a waveguide defining different regions having different widths and cladding thicknesses. The width and cladding thickness in a particular region are configured to loosely confine light in a first set of conditions and to tightly/highly confine light in a second set of conditions. The first and second set of conditions can correspond to the waveguide being positioned proximate to different materials having different indices of refraction.

15 Claims, 13 Drawing Sheets

*B-B*

(51) Int. Cl.
*G01N 21/77* (2006.01)
*G02B 6/122* (2006.01)

(56) References Cited

U.S. PATENT DOCUMENTS

| 8,274,040 | B2 * | 9/2012 | Zhong | G01N 21/6428 |
| | | | | 250/559.4 |
| 8,501,406 | B1 * | 8/2013 | Gray | C12Q 1/6869 |
| | | | | 435/6.1 |
| 8,780,344 | B2 * | 7/2014 | Tang | G01N 21/7743 |
| | | | | 356/301 |
| 8,837,871 | B2 * | 9/2014 | Fujii | G01N 21/552 |
| | | | | 385/12 |
| 9,223,084 | B2 * | 12/2015 | Grot | G01N 21/253 |
| 9,739,709 | B2 * | 8/2017 | Lear | G02B 6/4291 |
| 9,831,290 | B2 * | 11/2017 | Toriyama | H10N 70/231 |
| 11,181,477 | B2 * | 11/2021 | Rothberg | C12Q 1/6874 |
| 11,226,290 | B2 * | 1/2022 | Rothberg | C12Q 1/6869 |
| 2006/0251371 | A1 | 11/2006 | Schmidt et al. | |
| 2007/0081758 | A1 * | 4/2007 | Tono | G01N 21/7703 |
| | | | | 385/12 |
| 2008/0101744 | A1 * | 5/2008 | Keyser | G01N 21/7703 |
| | | | | 385/12 |
| 2008/0166095 | A1 | 7/2008 | Popovic et al. | |
| 2009/0073570 | A1 | 3/2009 | Lubart et al. | |
| 2009/0124024 | A1 * | 5/2009 | Kasai | G02B 6/124 |
| | | | | 422/82.11 |
| 2010/0150496 | A1 | 6/2010 | Heideman et al. | |
| 2012/0214707 | A1 * | 8/2012 | Ymeti | G01N 21/45 |
| | | | | 506/15 |
| 2012/0296322 | A1 | 11/2012 | Yamazaki et al. | |
| 2013/0142477 | A1 * | 6/2013 | Diemeer | G02B 6/03622 |
| | | | | 385/12 |
| 2015/0378097 | A1 | 12/2015 | Mizrahi et al. | |

* cited by examiner

100
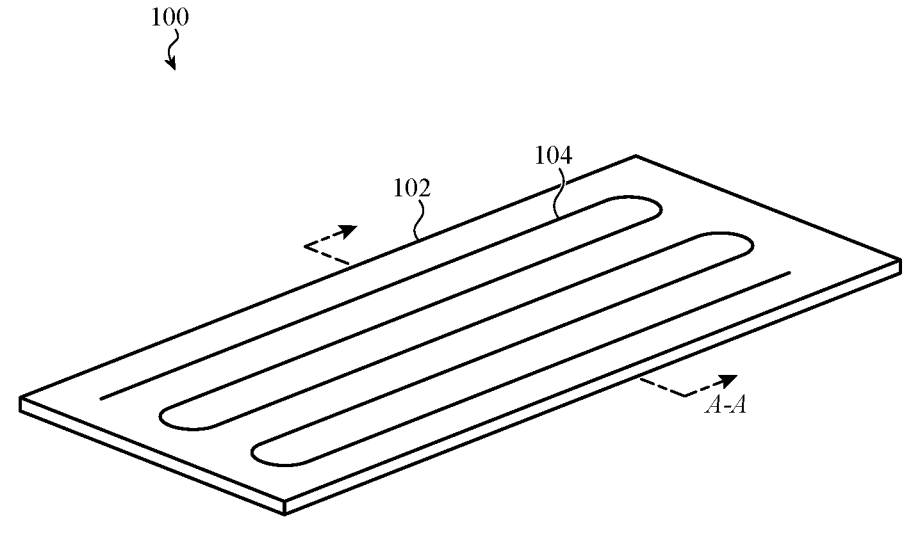
FIG. 1
200
200
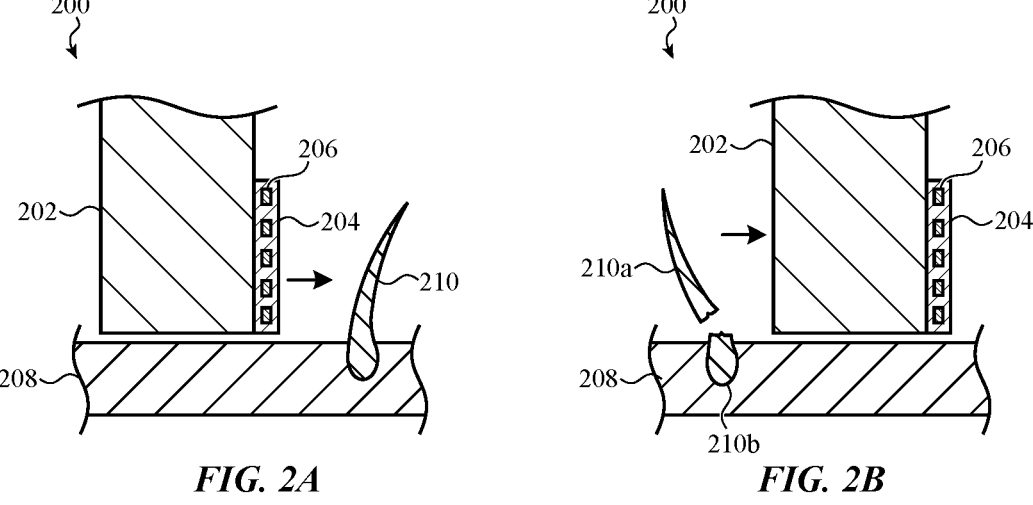
FIG. 2A                    FIG. 2B

300

400

SELECTIVE OPTICAL POWER DELIVERY DEVICE ~402

CONTROL ELECTRONICS 408

POWER SOURCE ~410

LASER LIGHT SOURCE ~406

PHOTONIC ROUTING ~412

VARIABLE MODE CONFINEMENT WAVEGUIDE(S) ~404

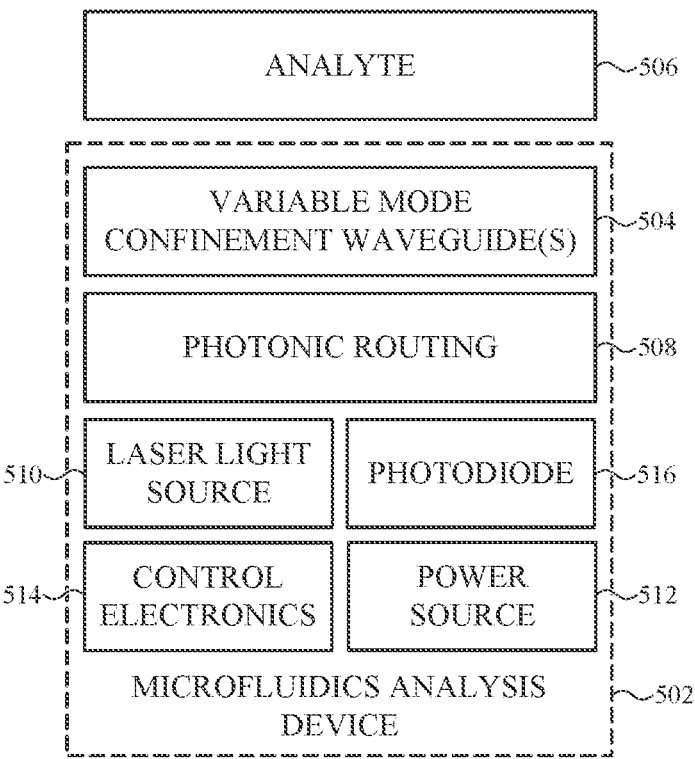
FIG. 5

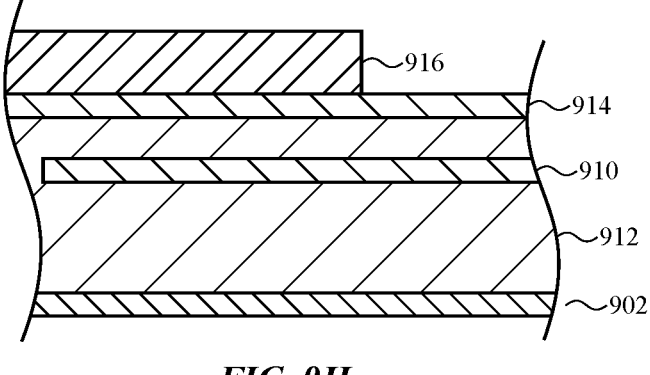
*FIG. 9H*
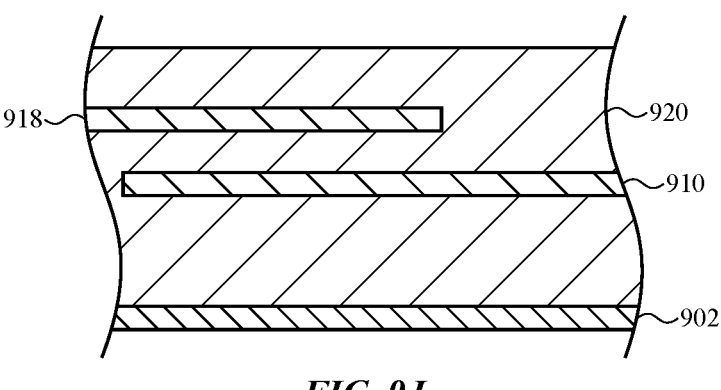
*FIG. 9I*
*FIG. 9J*

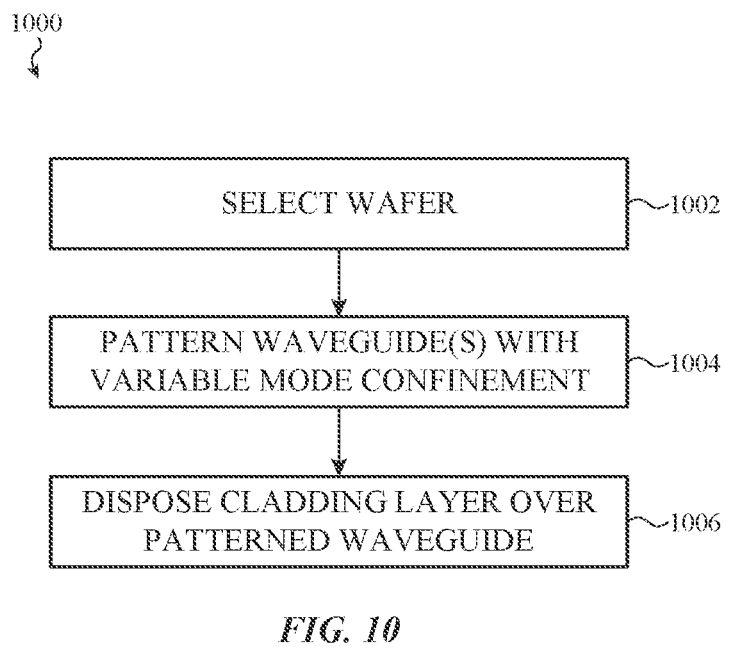

1000

SELECT WAFER ~1002

PATTERN WAVEGUIDE(S) WITH
VARIABLE MODE CONFINEMENT ~1004

DISPOSE CLADDING LAYER OVER
PATTERNED WAVEGUIDE ~1006

*FIG. 10*

1100
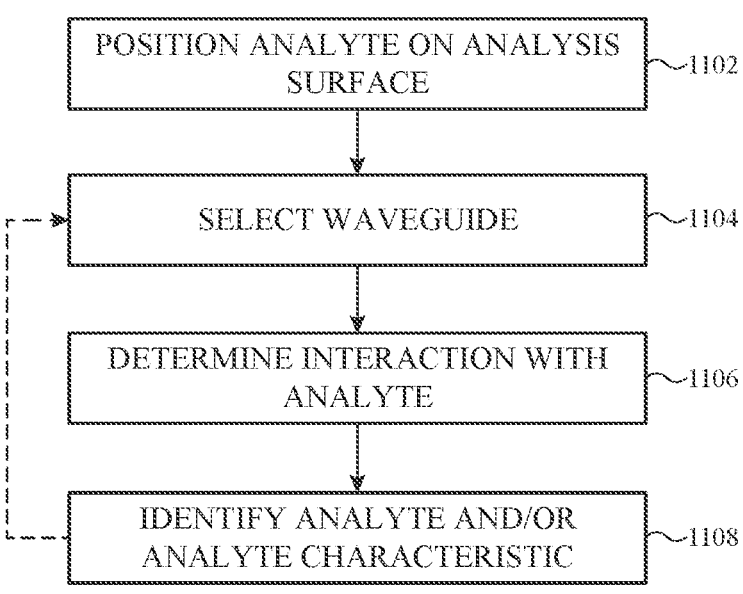
| POSITION ANALYTE ON ANALYSIS SURFACE | ~1102 |
| SELECT WAVEGUIDE | ~1104 |
| DETERMINE INTERACTION WITH ANALYTE | ~1106 |
| IDENTIFY ANALYTE AND/OR ANALYTE CHARACTERISTIC | ~1108 |
*FIG. 11*

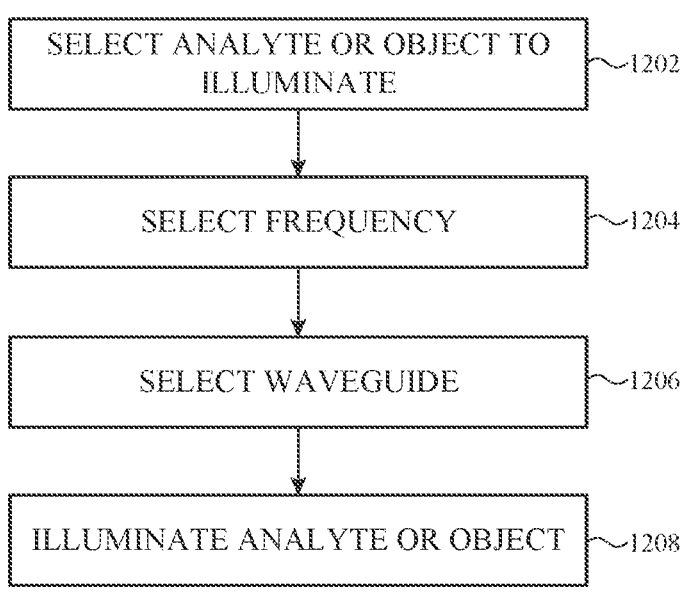
1200
SELECT ANALYTE OR OBJECT TO ILLUMINATE ~1202
SELECT FREQUENCY ~1204
SELECT WAVEGUIDE ~1206
ILLUMINATE ANALYTE OR OBJECT ~1208
*FIG. 12*

WAVEGUIDE WITH CONTROLLED MODE CONFINEMENT FOR ANALYTE INTERACTION AND OPTICAL POWER DELIVERY

CROSS-REFERENCE TO RELATED APPLICATION(S)

This application is a nonprovisional of, and claims the benefit under 35 U.S.C. § 119 of U.S. Provisional Patent Application No. 63/331,867 filed on Apr. 17, 2022, and entitled "Integrated Photonic Platform for Variable Optical Modem Confinement," the content of which is incorporated herein by reference in its entirety.

TECHNICAL FIELD(S)

Embodiments described herein relate to manufacturing and structuring of photonic circuits and waveguides and, in particular, to manufacturing and structuring of a waveguide engineered to exhibit different mode confinement properties in different regions. Embodiments described herein also relate to electronic devices incorporating an optical waveguide constructed to exhibit different mode confinement properties in different regions.

BACKGROUND

Photonic integrated circuits exhibit many advantages over conventional semiconductor circuits, especially in microfluidics applications. Conventional microfluidic analysis devices, however, require micrometer-scale physical channels, typically etched into a passivation layer, to transit and/or position an analyte over a photonic element, such as an interferometer branch. The sharp, rough, contours of etched fluid channels in conventional microfluidic applications introduce significant optical artifacts (e.g., crosstalk, reflections, refractions, and so on) that limit the potential usefulness, lifetime, and sensing bandwidth of such devices.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 1 depicts an example photonic element, illustrated as a serpentine waveguide, exhibiting region-specific and index-dependent mode confinement.

FIGS. 2A-2B depicts a cross section of an electronic device incorporating the photonic element of FIG. 1, viewed through line A-A shown in FIG. 1, in which the region-specific and index-dependent mode confinement exhibited by the serpentine waveguide is leveraged to induce local heating in (and/or other photodamage to) one or more chromophores of a human hair, thereby severing the hair without coupling optical power into the surrounding materials (e.g., skin, air, water, shaving cream, gel, and so on).

FIG. 5 is a simplified system diagram of another electronic device incorporating multiple waveguides, each exhibiting different region-specific and index-dependent mode confinement, that may be used for microfluidic analysis operations without requiring a fluid channel to convey or contain an analyte.

FIGS. 9A-9M depict sequential cross sections corresponding to intermediate steps of manufacturing an example simplified photonic integrated circuit, exhibiting region-specific and index-dependent mode confinement as described herein.

FIG. 10 is a flowchart depicting example operations of a method of manufacturing a photonic integrated circuit, such as described herein.

FIG. 11 is a flowchart depicting example operations of a method of operating an electronic device as described herein to perform microfluidic analysis of an analyte.

FIG. 12 is a flowchart depicting example operations of a method of operating an electronic device as described herein to impart optical power into an object or analyte.

The use of the same or similar reference numerals in different figures indicates similar, related, or identical items.

Figure 3:
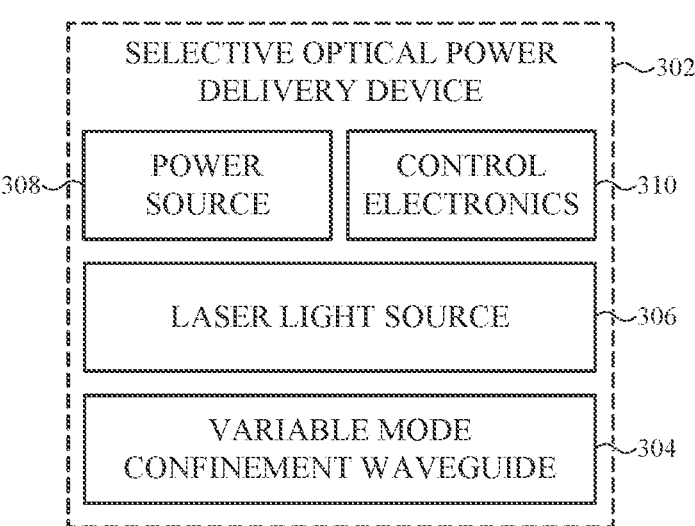
FIG. 3 is a simplified system diagram of an electronic device incorporating a waveguide exhibiting region-specific and index-dependent mode confinement.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to photonic circuits that leverage waveguide and cladding geometry to confine light given a first set of conditions or to not confine light given a second set of conditions. In this manner, the photonic circuit can be used to perform different operations in those conditions.

As a result of these constructions, objects or analytes positioned over a waveguide configured for transiting light along a path from an input region to an output region (which may not be required in all embodiments) as described herein can be selectively illuminated with substantially any suitable frequency or band of light that can be provided as input to that waveguide. In this manner, input light characteristics can be selected and/or tuned for particular purposes.

For example, input light (e.g., from a narrow line width laser) may be tuned to a band suitable to study a particular property of an object or analyte (e.g., via absorption spectroscopy or similar techniques) or may be tuned to deliver specific optical energy that can be readily absorbed by a particular compound, element, or component of the object or analyte.

In this manner, embodiments described herein are configured to leverage two separate effects in tandem that each affect whether and/or how efficiently light within a waveguide couples into a material, gas, analyte, or other object positioned nearby the waveguide, such as on or near an outer surface of a cladding disposed over the waveguide. First, specifically engineered waveguides and claddings permit light to couple into only materials exhibiting indices of refraction exceeding a threshold, substantially confining light otherwise. In this manner, waveguide and cladding geometries serve to target particular materials for illumination/irradiation. Second, specifically selected or tuned light can be provided as input to that engineered waveguide in order to induce a particular effect within only specifically targeted index of refraction thresholds.

More simply, a particular waveguide have multiple widths and transitions between those widths from an input to an output of that waveguide. The waveguide may likewise be disposed below a cladding that varies in thickness in different regions. The waveguide and cladding, together, define a photonic element. This photonic element can define a region in which the waveguide has a particular width and the cladding has a particular thickness over the waveguide. These two variables effectively cooperate to define a threshold index of refraction below which light is confined within the waveguide and at or above which light is only loosely confined. This threshold index of refraction may be referred to as the "characteristic" index of refraction of a particularly constructed photonic element.

In these constructions, the exterior surface of the cladding defines an optical interface that may abut gasses, liquids, or solids (collectively, "analyte"). Each analyte may have a different index of refraction, dependent upon its material(s) and construction. If the index of refraction of a particular analyte exceeds the characteristic threshold of a photonic element as described herein, light within the waveguide can couple into that analyte. Alternatively, if the index of refraction of the analyte does not exceed the characteristic threshold, light is not coupled into the analyte and instead remains confined within the photonic element.

In a more general phrasing, a photonic element as described herein selectively confines light. In a first condition in which an analyte below the characteristic threshold abuts the interface surface, the photonic element confines light. Given this condition, light does not couple into the analyte. In a second condition in which an analyte at or above the characteristic threshold abuts the interface surface, the photonic element only loosely confines light. Given this condition, light can couple into the analyte.

As may be appreciated by a person of skill in the art, characteristics of light (e.g., frequency, power, polarization, or others) can also influence confinement or coupling efficiency.

Generally and broadly, the wider a waveguide section is the better that waveguide section confines light. In another phrasing, as width of a waveguide increases so does the characteristic threshold index of refraction. Likewise, the narrower a waveguide section is the more loosely that waveguide section confines light. In another phrasing, as width of a waveguide decreases, so does the characteristic index of refraction.

It is similarly the case that longer wavelengths of light in a given waveguide effectively reduce the characteristic threshold, coupling into a broader range of indices of refraction. Conversely, shorter wavelength light effectively increases the characteristic threshold, coupling into a narrower range of indices of refraction.

For example, WAVEGUIDE A may be architected with a narrow width and WAVEGUIDE B may be architected with a wider width, and WAVEGUIDE C may be architected with a wider width still. In this examples, WAVEGUIDE A has a first characteristic threshold N1 and WAVEGUIDE B has a second, higher, characteristic threshold N2, and WAVEGUIDE C may have a third, higher still, characteristic threshold N3.

MATERIAL A can have a low index of refraction N4, and MATERIAL B can have a high index of refraction N5. In this example, N4 may be greater than N1, but less than N2, N3 and N5. With respect to MATERIAL B, N5 may be greater than N1, N2, and N4 but may be less than N5.

As a result of this example construction, WAVEGUIDE A couples light into both MATERIAL A and MATERIAL B and does not confine light tightly. WAVEGUIDE B couples light into MATERIAL B, but confines light and does not couple into MATERIAL A. WAVEGUIDE C, however, confines light in the presence of both MATERIAL A and MATERIAL B.

Table 1 is provided below outlining example effects that may be observed in respect of the examples above in which both MATERIAL A and MATERIAL B are placed on the same waveguide, either WAVEGUIDE A or WAVEGUIDE B or WAVEGUIDE C

TABLE 1

| WAVE-GUIDE | MAT. A (low index) | MAT. B (high index) | DESCRIPTION |
|---|---|---|---|
| A (narrow) | Couple | Couple | Light is coupled into both materials when placed over WAVEGUIDE A. |
| B (wider) | No effect | Couple | Light is coupled into MATERIAL B when either material is placed on WAVEGUIDE B. |
| C (widest) | No effect | No effect | No light is coupled into either MATERIAL A or MATERIAL B. |

In addition, as noted above, light provided as input to a particular waveguide can be tuned for particular purposes. For example, a specific frequency of light (FREQUENCY) may be selected to overlap with an absorption spectrum of a common component or solute in MATERIAL B. In this example, the targeted component/solute can absorb energy when light is coupled into MATERIAL B (e.g., WAVE- GUIDE B or C). Other components within MATERIAL B or MATERIAL A may not absorb significant energy from that light.

In this manner and as a result of this construction, when MATERIAL B is placed over WAVEGUIDE A or WAVE-GUIDE B, and light of FREQUENCY is applied as input to the selected waveguide, more light will be absorbed (and less light will be detected at the output of the waveguide) if the component is present within MATERIAL B. In this manner, received light can be used to sense whether the component is present, and/or within what concentration. As may be appreciated by a person of skill in the art, however, this example study of the component(s) within (or not within) MATERIAL B may be more effectively performed with WAVEGUIDE B than with WAVEGUIDE A, so as to leverage the higher characteristic threshold N2 and effectively filter out MATERIAL A.

As may be appreciated by a person of skill in the art, an apparatus—such as one including a waveguide engineered as described herein—that is configured for delivering particular light only into specifically targeted materials or material types has a number of important and valuable use cases and applications.

For example, such an apparatus may be used for wideband absorption spectroscopy for analyte identification and characterization. In particular, such an apparatus can be used as a "lab-on-a-chip" device configured to perform a number of microfluidic analysis operations, tests, and/or studies of a known or unknown analyte positioned on an interface surface of that apparatus.

In other cases, an apparatus as described herein can be used for highly targeted optical power/energy delivery. For example, such an apparatus may be useful for hair removal and/or shaving. In these embodiments, a waveguide can be engineered to exhibit a characteristic threshold below that of human hair, but above that of shave gel, shave oil, shave cream (collectively, "shave lubricants"), anti-irritants, air, water, or human skin.

In other cases, an apparatus may be useful in industrial applications for oxide layer removal or other surface ablation and/or surface finishing purposes. In yet other examples, an apparatus as described herein may be useful for laser etching, laser marking, or stamping (e.g., a waveguide can be formed in a particular shape, such as a logo, and placed against a workpiece which may be selectively ablated in the shape of the waveguide itself).

In yet other examples, an apparatus as described herein can be used for material or surface finish quality assurance in a manufacturing context. For example, an apparatus may be placed against a finished surface (e.g., a painted surface, anodized surface, and so on) and may indicate a PASS or FAIL depending upon whether light passing through a particular waveguide couples into the finished surface or not.

These foregoing example embodiments are not exhaustive; the systems, apparatuses, and methods described herein may be useful in a number of residential, medical, surgical, manufacturing, industrial, or personal use applications.

More broadly, engineered waveguides as described herein can be positioned/disposed below a contiguous, smooth, interface surface configured to receive, in some embodiments, an analyte sample. The interface surface can be defined by a cladding disposed over the waveguide, which, in many embodiments although not required, may have an area on the order of 0.5 cm$^2$-5 cm$^2$, providing a large receiving area for placing and positioning the analyte sample (e.g., dropper, pipette, forceps, and so on).

The analyte sample, which may be a fluid or a solid, can be placed on the interface surface, for example by a pick-and-place device or a lab technician. In these embodiments, geometry of the waveguide and/or the thickness of cladding influences and controls whether light input to that particular waveguide couples into the analyte sample or not. If light can be coupled into the sample, properties of the light input to the waveguide can be selected so as to induce or encourage a desired effect when interacting with the analyte.

In another nonlimiting phrasing, geometry of a waveguide and/or an associated cladding controls mode confinement properties of that waveguide. Given a structure that confines light, no light is/can be coupled into an analyte sample. Conversely, light can be coupled into an analyte sample given a structure that does not confine light.

In view of the foregoing, a single waveguide and/or a set of differently constructed waveguides defined below the same interface surface can be used to study, identify, and/or characterize one or more discrete properties of a single analyte sample or a constituent part thereof. Such studies can include, and/or may leverage, direct absorption spectroscopy techniques to determine light absorption by the analyte as a function of wavelength of a single-frequency laser pulse or beam provided as input to one or more of the waveguides.

In some cases, the source laser may be a tunable narrow linewidth laser which may be optically coupled via a photonic switching network to one or more waveguides, as described above. Characterizing absorption properties of the analyte—as one example—can be a first step to identifying the analyte, identifying a material property of the analyte, identifying a constituent component of the analyte, identifying a compound dissolved in the analyte, and so on. In some cases, a concentration of a particular compound can be determined and/or inferred based on an amount of absorption observed.

Further, as noted above, differently constructed waveguides can exhibit different modal confinement properties. In this manner, multiple waveguides can be used to study different properties of the same analyte without technicians, pick-and-place machines, or analysts being required to position different samples of analyte onto different conventional microfluidic analysis devices.

More simply, a first waveguide may be engineered to study a first property whereas a second waveguide—disposed below the same interface surface as the first waveguide—may be engineered to study a second property. In some examples, the first waveguide confines light while the second waveguide does not. In this manner, the first and second waveguides can be positioned adjacent to one another, formed in the same or similar processes, and/or operate at the same time without interference or crosstalk as only one of the two waveguides couples light into the analyte at any given time.

Further still, as may be appreciated by a person of skill in the art, large size interface surfaces, such as those described herein, support inclusion of physically longer waveguides which can facilitate interaction between an analyte and light over a greater area (and/or volume, analyte depending) given the same sampling time and/or input laser power. As a result, systems described herein that leverage specifically engineered waveguides with controlled mode confinement can be used to study properties of one or more analytes at a time with significantly improved accuracy, precision, and speed when compared to conventional microfluidic analysis devices.

As described in greater detail below, a waveguide as described herein can be engineered to exhibit situationally dependent mode confinement in a number of suitable ways. For example, in some embodiments, a waveguide having a particular width below a cladding of a particular thickness may only couple light into certain analytes that have at least a threshold index of refraction.

Similarly, such waveguides may not couple light into other analytes exhibiting other indices of refraction. In this manner, a particular waveguide can be designed so as to only couple light into analytes or samples that exhibit particular indices of refraction that exceed a threshold. In these examples, once light is coupled into an analyte, the effects imparted by the analyte can be studied, for example by direct absorption spectroscopy.

In other embodiments, an electronic device incorporating waveguides with situationally dependent mode confinement properties can be structured and/or used for selective optical power delivery. For example, laser light can be provided as input to a particularly designed waveguide configured to confine light in the presence of a wide range of indices of refraction, including a band of indices of refraction that align with and/or overlap an absorption spectrum of a target compound.

In this manner, an electronic device as described herein can effectively irradiate a compound, molecule, or particle that, due to its physical properties (i.e., absorption spectrum), absorbs significant energy from the coupled light. This absorbed energy converts to heat which in turn can vaporize and/or otherwise destroy, fracture, decompose or otherwise modify the compound itself, and/or other surrounding elements and or structures.

More generally, a waveguide as described herein can be structured so that if it is placed in contact with a material having an index of refraction falling within a suitable range, light will couple into that material. A narrow line width laser light source can thereafter be selected to emit light at frequency that overlaps an absorption wavelength of a specific compound within the material.

As a result of this construction, laser light provided as input to the waveguide is confined and does not meaningfully couple to or illuminate the ambient environment or other nearby materials in substantially all circumstances. For a narrow category of materials with an index exceeding a threshold, light from the laser will only be loosely confined and will couple at least partially into those materials.

Among these materials into which light from the waveguide can couple, only those materials including a compound with an absorption spectrum overlapping the laser will absorb significant energy output by the laser. In these examples, as may be appreciated by a person of skill in the art, tuning the laser to provide pulsed output and/or a specific threshold power for a particular period of time can induce a desired destructive effect into the targeted compound itself within the targeted material.

As one specific example, a device as described herein can be used to precisely sever human hair without coupling significant optical energy into surrounding skin, air, water, shave gel, or shaving cream. For example, a waveguide as described herein can be structured so that if it is placed in contact with a human hair having a specific index of refraction, light will couple into that human hair.

A narrow line width laser light source can thereafter be selected to emit light at frequency that overlaps an absorption wavelength of a specific chromophore (e.g., eumelanin or pheomelanin) within that hair. As a result of this construction, laser light provided as input to the waveguide is confined and does not illuminate the ambient environment or surrounding material, including the surface of the skin, in substantially all circumstances.

However, when placed in contact with a hair having an appropriate index of refraction, light from the laser will only be loosely confined and will couple at least partially into the hair. Among these hairs into which light from the waveguide couples, only the specific targeted chromophore with an absorption spectrum overlapping the laser's output bandwidth will absorb energy output by the laser and coupled into the hair.

As noted above, in these examples, tuning the laser specifically to provide suitable pulsed output and/or a specific threshold power for a particular period of time can induce a destructive effect into the target chromophore, which in turn can damage and/or weaken the surrounding structure. More simply, the chromophore absorbs the laser light and produces heat which, in turn, causes localized thermal damage to the surrounding keratin structure, inducing a fracture and/or breakage in the hair.

More simply, an electronic device as described herein can be used as a shaving device for aesthetic or surgical purposes. The device can include a flat, smooth interface surface below which one or more waveguides as described above can be formed. In some cases, the waveguide may take a serpentine path along a length of the interface surface, which may have an aspect ratio greater than 1. As the device is passed over dermal regions with hair, laser light is only coupled into hair and does not couple into skin or other surrounding structure or tissue, as skin typically exhibits a different refractive index (e.g., ~1.35) from hair (e.g., ~1.55).

By selecting laser light with a frequency that overlaps an absorption wavelength of a chromophore (or other compound or structure) within hair, hair can be quickly severed. Specifically, compounds in the hair that can absorb the laser light do absorb the laser light and either vaporize or otherwise locally increase in temperature, thereby breaking down surrounding structure and severing the hair.

These foregoing examples are not exhaustive; generally and broadly, embodiments described herein specifically structure waveguides so that light—of substantially any frequency or bandwidth—passing through those waveguides only couples into particular materials. More specifically, waveguides as described herein are constructed to be highly selective with respect to what materials can be illuminated by that laser light.

Once a particular waveguide and cladding combination structure can couple light into materials exhibiting at least a threshold index of refraction, light having specific properties (e.g., frequency, line width, power, duty cycle, and so on) can be provided as input to that waveguide so that (1) specific properties of the material or its constituents can be studied, (2) particular structures can absorb optical energy as heat, or (3) for another purpose or combination thereof. For example, in some cases, a high index particular may be suspended in a low index solution—in these cases, the particular may couple with the waveguide whereas the solution may not.

A simplified analogy may be to theater lighting. The physical structure of a waveguide as described herein may be analogous to a spotlight on a movable mount and the light within the waveguide may be analogous to a color filter that can be placed over that spotlight. By moving the spotlight (e.g., changing the dimensions of the waveguide and/or cladding), a theater technician can very specifically control what specific group of stage objects are illuminated. By changing the color filter (e.g., properties of laser light or broad band light input to the waveguide), the theater technician can control what color of light, specifically, illuminates the targeted object.

Following this analogy, the structure of the waveguide defines circumstances under which light within the waveguide couples into certain materials with certain refractive indexes satisfying a threshold. The characteristics of light input to the waveguide (e.g., frequency, power, line width, and so on) varies from embodiment to embodiment, and may be selected for targeted power absorption purposes (e.g., hair trimming) and/or for spectrum study purposes.

More generally, some waveguide embodiments described herein can be incorporated into devices configured for shaving. Devices incorporating waveguides as described herein can be implemented as safe-to-touch, optical razors for personal hygiene or surgical preparation purposes. Importantly, as such devices do not require a physical blade, such devices do not dull or become less effective over time. Further, in a powered off state, such devices are entirely safe to handle as no cutting edges are required.

In other cases, embodiments described herein can be used as dental devices for plaque removal, scaling, and/or root planning. In other embodiments, devices described herein can be used for cauterization or sterilization. In some embodiments, devices described herein can be used to destroy specific cells or compounds in a specimen that includes particular compounds (e.g., targeted cancer treatment, aesthetic dermatology, tattoo removal, and so on).

In other embodiments, some waveguides as described herein can be incorporated into devices configured for spectrographic compound analysis. Such devices may be used in laboratory environments or diagnostic devices configured to identify disease markers, specific compounds (or lack of specific compounds) in blood, saliva, or other biological or nonbiological substances, structure of cells, solutes in solution, and so on. Importantly, as noted above, embodiments described herein do not require fluid channels or other optically disruptive structures; an analyte sample can be placed on a large area interface surface without attention paid to precise alignment or sample volume.

These foregoing and other embodiments are discussed below with reference to FIGS. 1-12. However, those skilled in the art will readily appreciate that the detailed description given herein with respect to these figures is for explanation only and should not be construed as limiting.

In particular, FIG. 1 depicts an example photonic element that may be a portion of a photonic integrated circuit, the photonic element manufactured, at least in part, by methods and techniques described herein.

In particular, FIG. 1 illustrates a photonic element 100 defined by a base substrate 102 and waveguide 104. The base substrate 102 can be formed from an insulating material such as a silicon oxide. The waveguide 104 can be formed from any suitable optically transparent material. In some cases, the waveguide 104 can be formed from silicon nitride, and may be configured to confine infrared laser light, such as may be emitted from a laser diode or other laser light source.

A person of skill in the art may readily appreciate that the waveguide 104 can be optically coupled to a laser light source in a number of suitable ways. A laser light source is omitted from FIG. 1 for purposes of simplicity of illustration. For example, the waveguide 104 can define an input and output facet which in turn can be optically coupled to one or more photonic circuits. In some cases, the input facet of the waveguide 104 can be coupled to a fiber optic cable that in turn is optically coupled to a laser light source. May configurations and constructions are possible.

In the illustrated embodiment, the waveguide 104 can be passivated and/or encapsulated by a cladding layer which may be formed from a silicon oxide or other suitable insulating material. In many cases, the cladding layer can be formed to have a smooth surface so as to reduce any undesirable optical coupling that might result from sharp features or abrupt changes in thickness. The cladding overlaying the waveguide 104 is not depicted in FIG. 1 for simplicity of illustration.

The cladding not only protects the waveguide 104 from oxidation and other environmentally induced degradation or failure but it also defines a smooth interface surface onto which one or more materials can be placed. In other cases, the interface surface defined by the cladding can be positioned over another larger object, such as a skin in a hair-cutting implementation (see, e.g., FIGS. 2A-2B).

As noted with respect to other embodiments described herein, physical properties of a waveguide, such as the waveguide 104, can influence confinement properties exhibited by that waveguide. Similarly, cladding thickness over the waveguide 104 can also influence the confinement properties exhibited by the waveguide.

In particular, as width of a waveguide such as the waveguide 104 changes, confinement properties of the waveguide likewise change. In addition, as cladding over the waveguide 104 increases or decreases in thickness, confinement properties of the waveguide also change. As may be appreciated by a person of skill in the art, relatively thick claddings can ensure complete confinement whereas very thin claddings may permit coupling of light into a wide range of materials with a wide range of indices of refraction.

In this manner, primarily two variables can influence whether light passing through the waveguide 104 will couple into a particular material that exhibits a particular index of refraction: cladding thickness and waveguide geometry. By changing one or both of these variables, the waveguide 104 can be modified to be configured to preferentially couple light into materials having indices of refraction at or above a characteristic threshold, confining light in other circumstances.

In some cases, width of the waveguide 104 can be set and/or selected to adjust and/or tune confinement properties of the waveguide 104. In other cases, thickness of the waveguide 104 can be set and/or selected to adjust and/or tune confinement properties of the waveguide 104.

As may be appreciated by a person of skill in the art, as the thickness of the waveguide 104 increases, more tightly controlled confinement may be observed. Similarly, as the waveguide 104 is thinned, looser confinement may be observed. Similarly confinement changes as the width of the waveguide 104 changes. Specific combinations of thickness and width define what ranges of indices of refraction can experience coupling to the waveguide 104 and which ranges of indices of refraction encourage tighter confinement within the waveguide 104. Thickness and width of the waveguide 104 varies from embodiment to embodiment.

In many cases, the waveguide 104 may have differently structured regions along its path so as to exhibit different confinement properties in different regions thereof. For example, the waveguide 104 may have geometry (e.g., width and/or thickness) encouraging tight confinement in coupling regions configured for optically coupling to other photonic circuits, photodiodes, fibers, laser light sources, and so on and/or for routing between circuits. In other locations, the waveguide 104 may be configured for loose coupling with thinner cladding and/or increased width. In yet other regions, the waveguide may transition (e.g., via a taper) from one width or thickness to another width or thickness.

As noted above and with respect to other embodiments described herein, the cladding disposed over the waveguide 104 defines an interface surface onto which a material can be placed or, in some cases, an interface surface that itself may be placed in contact with a material. Once positioned in contact with a material that exhibits an index of refraction that falls within the loose confinement range for the waveguide 104, light can be coupled into that material. As noted above, properties of the light provided as input to the waveguide may change from embodiment to embodiment and may be selected for analysis purposes and/or power transfer purposes.

In one example embodiment, the photonic element 100 can be coupled to a laser light source configured to emit laser light at a frequency that is absorbed by a chromophore present in human hair. In this example, the waveguide 104 can be designed with a thickness and/or a width (selected in respect of the thickness of a cladding overlaid the waveguide 104) that loosely confines light in the presence of an object or material with an index of refraction of approximately 1.55, but confines light in the presence of an object or material with a lower index of refraction, such as human skin which may be approximately 1.50. The laser light source may be within a housing of the device or may be external to the device coupled by a fiber or other suitable coupling.

As a result of this difference in index, the photonic element 100 can effectively distinguish between skin and hair structures, illuminating only hair. Phrased in another manner, the photonic element 100 tightly confines light in regions wetting to skin, but loosely confines light in regions wetting to/contacting hair. In this way, light within the waveguide 104 is only coupled into the hair. Given this construction that selectively couples into hair but not skin, laser light suitable to study the hair (e.g., spectroscopy) or a property thereof can be provided as input to the waveguide 104. In other embodiments, however, the laser light can be selected to induce a desirable effect in the hair itself, such as targeted destructive heating of a chromophore within the hair.

More specifically, a chromophore has a known absorption spectrum that may include various peaks and valleys which respectively indicate strong absorption or weak absorption of particular frequencies of light (which may be visible light or infrared, as examples). By selecting or tuning laser light to a frequency that is strongly absorbed by the chromophore(s), significant optical power—coupled into the hair as a result of the structure of the waveguide 104—can be absorbed by the chromophore(s) which the chromophore may radiate as heat.

In some cases, the chromophore itself may vaporize or otherwise be destroyed. In yet other examples, the heat radiated by the chromophore may damage or weaken nearby keratin or cellular structure which in turn can induce fracture and/or breakage in the hair. More simply, the photonic element 100 can be used as an optical razor, suitable for cutting human hair without irradiating or illuminating surrounding skin.

Further, as a result of the concentrated area over which a hair and the waveguide 104 overlap, the fracturing of the hair takes place very precisely. More colloquially, an optical razor as described herein appears to be extremely sharp to a user; merely drawing the waveguide 104 over a hair severs that hair. Further still, because there is no significant mechanical interaction (e.g., pulling) between the hair and the photonic element 100 apart from friction between the interface surface and the hair, a user may perceive an optical razor as described herein to be smooth to use and less irritating to skin or follicles/roots. Additionally, as noted above, an optical razor as described herein does not dull over time and may be used for a significantly longer period than disposable razors or mechanical razors that each require periodic sharpening or replacement.

FIGS. 2A-2B depict a cross section of an electronic hair cutting device incorporating the photonic element 100 of FIG. 1, viewed through line A-A shown in FIG. 1, in which the region-specific and index-dependent mode confinement exhibited by the waveguide 104 is leveraged to induce local heating in (and/or other photodamage to) one or more chromophores of a human hair, thereby severing the hair without coupling optical power into the surrounding skin.

Specifically, the electronic device 200 can include a power supply, a laser light source, and control electronics within a housing 202. In some cases, the power supply and laser light source may be external to the housing 202. The housing 202 can enclose and support the photonic element 100 as shown in FIG. 1, labeled in FIG. 2 as the photonic element 204. The photonic element 204 is manufactured with a waveguide 206 (corresponding to the waveguide 104), that can follow a serpentine path, such as shown in FIG. 1.

In this example, the photonic element 204 includes a cladding that may be formed to a particular thickness/depth over the waveguide 206 that cooperates, structurally and optically, with the width and thickness of the waveguide 206 to exhibit different mode confinement properties, such as described above. Specifically, the cladding and the waveguide 206 can be designed together so as to couple into a material having a refractive index of hair, but to confine light and not couple into a material having a refractive index of skin.

As a result, as the electronic device 200 is positioned over or near the skin of a user 208, and drawn towards and over a hair 210 of the user 208 (refer to the transition between FIG. 2A-2B), the hair 210 can be fractured into two parts, the portions 210*a*, 210*b*.

It may be appreciated that these foregoing embodiments depicted in FIGS. 1 and 2A-2B and the various alternatives thereof and variations thereto are presented, generally, for purposes of explanation and to facilitate an understanding of various configurations and constructions of an electronic device that can incorporate a waveguide and/or photonic element such as described herein. However, it will be apparent to one skilled in the art that some of the specific details presented herein may not be required in order to practice a particular described embodiment or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, an optical razor implementation may not be required. In other cases, photonic hair cutting or shearing devices can be manufactured to sever hair distal to a user's skin, such as for trimming and not shaving. Such embodiments may take the form of a clamshell structure configured to grasp and sever hair positioned within the clamshell structure.

In other implementations, an electronic device as described herein can be structured in other ways. For example, embodiments described herein can be configured and constructed for surface ablation, surface finishing, oxide layer removal, printing, stamping, etching, and so on. Many applications are possible. Generally and broadly, embodiments described herein can be used in any circumstance in which preferentially delivering optical energy to a substance, compound, or element could serve a functional purpose. Such a device may be broadly referred to as a selective optical power delivery device.

Further, it may be appreciated that a selective optical power delivery device as described herein can also measure properties of light received at an output of a waveguide as described here (e.g., photodiode power monitoring or the like). Such constructions may be used to determine coupling efficiency, power delivered, cleanliness of an interface surface, and so on. For example, an optical razor as described above may be configured or configurable to monitor light within the waveguide so as to generate recommendations to a user to clean the interface/shaving surface, to polish the shaving surface, to choose a shave lubricant with a different index of refraction, and so on. Many embodiments are possible.

FIG. 3 is a simplified system diagram of a selective optical power delivery device incorporating a waveguide exhibiting region-specific and index-dependent mode confinement. The electronic device 300 can be any suitable electronic device including but not limited to personal electronic devices, portable electronic devices, industrial equipment, dental or medical equipment, and so on, or accessories or attachments thereto.

The electronic device 300 can include a housing 302 manufactured from an application-specific suitable material. Example materials include by are not limited to metals, plastics, acrylics, glass, and the like. The housing 302 can define an exterior surface and an interior surface. The exterior surface may be manipulated by a user in applications in which the electronic device 300 is a portable electronic device or the exterior surface may be configured for placement on a surface, such as a lab bench or the like.

The housing 302 can include an aperture (not shown in the simplified system diagram of FIG. 3), through which a variable mode confinement waveguide 304, such as described herein, may extend. In particular, an interface surface of the variable mode confinement waveguide 304 may be defined by an exterior surface of a cladding such as silicon dioxide. The interface surface may serve to define a portion of the exterior surface of the housing 302.

In other cases, other cladding materials may be used and/or disposed over a lower cladding layer. Example materials may include materials resistant to surface damage or scratching (e.g., high Mohs rating materials), or coatings over the cladding that preserve surface cleanliness and/or finish such as oleophobic or hydrophobic coatings. A person of skill in the art may readily appreciate that such coatings may, in some cases, change optical properties and/or coupling properties of the variable mode confinement waveguide 304. Should an application require such coatings, modification to the cladding thickness and/or waveguide thickness or width may be required.

The electronic device 300 also includes a laser light source 306 which is optically coupled to the variable mode confinement waveguide 304 in a suitable manner. In particular, the laser light source 306 may be directly optically coupled to an input facet or port of the variable mode confinement waveguide 304; in other cases, the laser light source 306 can be optically coupled to the variable mode confinement waveguide 304 via a photonic switching network or one or more other optical circuits. In some cases, one or more laser light tuning circuits may interpose the variable mode confinement waveguide 304 and the laser light source 306. An example optical circuit interposing the variable mode confinement waveguide 304 and the laser light source 306 may include a resonator so as to reduce a line width of laser light output by the laser light source 306. This is merely one example; it is appreciated that the variable mode confinement waveguide 304 and the laser light source 306 can be coupled in any suitable permanent or configurable manner.

The laser light source 306 can be configured to output any suitable frequency of light and/or any suitable bandwidth of light. In many embodiments, although not required, the laser light source 306 may be configured as a single frequency laser, configured to output a very narrow band laser light. In other cases, the laser light source 306 can be configured to output a wider band of laser light. The laser light source 306 can be configured to operate in any suitable spectrum segment including infrared light and visible light. A person of skill in the art may readily appreciate that material choices for the variable mode confinement waveguide 304 may be informed by the band of laser light required of a particular application. Waveguide materials suitable for visible light may not be suitable for infrared light and vice versa. The laser light source 306 may be internal to or external to the housing 302.

In many embodiments, silicon nitride or crystalline silicone may be selected as a material for the variable mode confinement waveguide 304. As known to a person of ordinary skill in the art, silicon waveguides and silicon nitride (SiN) waveguides exhibit different properties and may be desirable in different circumstances. For example, a SiN waveguide may be selected for power handling reasons, low loss reasons, larger transparency windows (e.g., ability to guide visible and infrared light), input/output coupling, and so on. A silicon waveguide may be selected for its high refractive index, narrow transparency window (for infrared implementations), or for other properties such as electrical or thermal properties. Accordingly, generally and broadly, it may be appreciated that a photonic circuit such as described herein may be desirably designed with both silicon waveguides and SiN waveguides.

Independent of construction or tuning, the laser light source 306 can be conductively coupled to a power source 308 and/or to the control electronics 310. The control electronics 310 can be configured to operate with the power source 308 to deliver appropriate power to the laser light source 306 so as to maintain and/or establish consistent optical power output. More particularly, the control electronics 310 can be configured in some embodiments to monitor optical output of the variable mode confinement waveguide 304 (e.g., by monitoring output of a photodiode coupled to an output of the variable mode confinement waveguide 304) and based on variations in power output, can adjust power to the laser light source 306 supplied by the power source 308.

It may be appreciated that these foregoing embodiments depicted in FIG. 3 and the various alternatives thereof and variations thereto are presented, generally, for purposes of explanation, and to facilitate an understanding of various configurations and constructions of an electronic device that can incorporate a waveguide and/or photonic element for optical power delivery, such as described herein. However, it will be apparent to one skilled in the art that some of the specific details presented herein may not be required in order to practice a particular described embodiment or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, a device can include multiple variable mode confinement waveguides which can be selectively enabled (i.e., optically coupled to) by operation of an optical switching network or photonic switching network.

Figure 4:
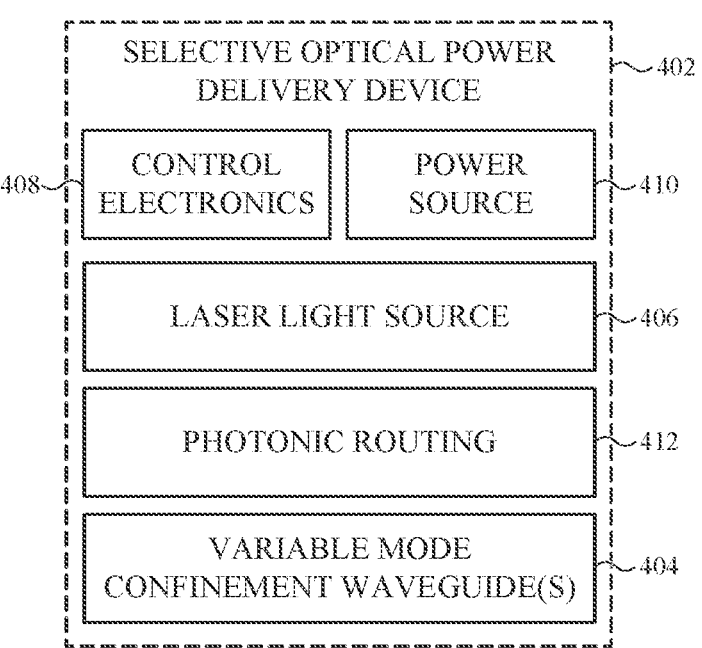
FIG. 4 is a simplified system diagram of another electronic device incorporating multiple waveguides, each exhibiting different region-specific and index-dependent mode confinement.

FIG. 4 is a simplified system diagram of another electronic device incorporating multiple waveguides, each exhibiting different region-specific and index-dependent mode confinement.

As with the embodiment shown in FIG. 3, the system diagram of FIG. 4 depicts an electronic device 400 that includes a housing 402 which encloses and supports a variable mode confinement waveguide array 404. The variable mode confinement waveguide array 404 can include any suitable number of individual waveguides. In many cases, each waveguide of the variable mode confinement waveguide array 404 can be configured with a different width and/or a different placement location below a common interface surface. In these examples, different regions of an interface surface can be provided with optical power and/or different materials of different refractive indices can be selected.

More generally, different waveguides of the variable mode confinement waveguide array 404 can be configured to loosely and/or strongly confine light in the presence of different indices of refraction. A first waveguide of the variable mode confinement waveguide array 404 can couple into a material having a first refractive index whereas a second waveguide of the variable mode confinement waveguide array 404 can be configured to couple into a material having a second refractive index.

As one example, different human hair may exhibit slightly different indices of refraction. As a result, a single waveguide optical razor may not be suitable to sever all types and/or colors of human hair. In such examples, different waveguides can be selected to couple into different hair such that chromophore-targeting laser light can be appropriately coupled into a waveguide that has suitable properties (e.g., width) enabling it to couple into a material having the necessary index of refraction.

In other cases, the electronic device 400 can be configured to provide different options and/or different functionality that may be selectable by a user of the electronic device 400. For example, the user may be presented with a display or other user or device interface to cause a particular waveguide to be selected for a particular purpose.

In other cases, multiple waveguides can be operated at the same time. More specifically, multiple waveguides can receive light from a laser light source 406 at the same time. The laser light source 406 may be within or external to the housing 402. In this manner, multiple different materials (having different indices of refraction) can be illuminated/irradiated at the same time.

These foregoing examples are not exhaustive; generally and broadly, it may be appreciated that an electronic device, such as the electronic device 400, can include more than one waveguide arranged in any suitable pattern. The waveguides of the variable mode confinement waveguide array 404 can each follow the same path or may be disposed to follow substantially similar path whereas in other cases, the variable mode confinement waveguide array 404 can be configured to follow unique paths which may be specific to each individual waveguide of the variable mode confinement waveguide array 404.

As with other embodiments described herein, the electronic device 400 includes control electronics, identified as the control electronics 408, and a power source 410. The power source 410 may be a battery or a connection to mains. In other cases, the power source 410 may be exterior to the housing 402.

The power source 410 and the control electronics 408 can cooperate to deliver appropriate electrical power to the laser light source 406. The laser light source 406, in turn, can provide output to an input facet or optical coupling to a photonic routing network 412. The photonic routing network 412 can include one or more controllable elements, such as Mach-Zehnder Interferometers (MZIs) or other control structures that allow for photonic switching. In this manner, the control electronics 408 can effectively control which waveguide of the variable mode confinement waveguide array 404 is operated (i.e., is optically coupled to the laser light source 406) at any given time.

It may be appreciated that these foregoing embodiments depicted in FIG. 4 and the various alternatives thereof and variations thereto are presented, generally, for purposes of explanation, and to facilitate an understanding of various configurations and constructions of an electronic device that can incorporate a waveguide and/or photonic element for optical power delivery such as described herein. However, it will be apparent to one skilled in the art that some of the specific details presented herein may not be required in order to practice a particular described embodiment or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, a variable confinement waveguide as described herein can be used for studying a material and not just or only for optical power delivery. For example, a laser light source may be selected to illuminate an object wetted to an interface surface or other object in contact with an interface surface so as to study an absorption spectrum of that material or components thereof. For example, a photodiode or an array of photodiodes can be used to receive light from a waveguide that has interacted with an analyte (e.g., partially absorbed by the analyte) in proximity of the waveguide. Based on output from the photodiodes, an absorption spectrum can be determined which, in turn, can be used to identify materials or material properties of the analyte. More generally, an electronic device as described herein can be used as a microfluidics analysis device.

FIG. 5 is a simplified system diagram of another electronic device incorporating multiple waveguides, each exhibiting different region-specific and index-dependent mode confinement, that may be used for microfluidic analysis operations without requiring a fluid channel to convey or contain an analyte.

The system diagram depicts an electronic device 500 that includes a housing 502. The housing 502 defines an exterior surface which is formed, at least in part by an interface surface of a variable mode confinement waveguide array 504. As with other embodiments described herein, the variable mode confinement waveguide array 504 includes a number of individual waveguides, each of which may be differently sized so as to couple into materials of different refractive indexes or materials that fall within different refractive index ranges.

The variable mode confinement waveguide array 504 can be encapsulated by a passivation layer (also referred to as a cladding) that itself defines a flat, smooth interface surface onto which an analyte sample 506 can be placed. The analyte sample 506 may be a liquid, solid, or gas. In the case of a solid, the analyte sample 506 may be placed over the interface surface defined by the cladding disposed over the variable mode confinement waveguide array 504.

In the case of a liquid, the analyte sample 506 may be dropped or sampled onto the interface surface so that the sample may wet to the interface surface. In some cases, a bonding layer may be disposed on the interface layer. The bonding layer (or preparation layer) can be any suitable material configured to bond to particular compounds within an analyte such as the analyte sample 506. A bonding layer may not be required in all embodiments. In some cases, a surfactant may be used to encourage wetting.

In other cases, an appropriately phobic material may be disposed on the interface surface so as to discourage wetting of a liquid sample to the interface surface. For example, a lipophobic material may be placed on the interface surface if the analyte sample 506 is a lipid based solution.

In the case of a gas, the interface surface may form a portion of a sealed volume into which a test gas can be added. In other cases, the analyte sample 506 may be a constituent component of air surrounding the electronic device 500. A person of ordinary skill in the art may appreciate that appropriate structure or methods suitable for positioning or retaining the analyte sample 506 over the variable mode confinement waveguide array 504 varies from embodiment to embodiment.

The variable mode confinement waveguide array 504 can be coupled to a photonic routing network 508 so that different waveguides of the variable mode confinement waveguide array 504 can receive laser light from a laser light source 510 given different test conditions. For example, a first waveguide may be configured to couple into a particular analyte whereas another waveguide may be configured to couple into a different analyte. In these examples, the photonic routing network 508 can be operated to select the first waveguide in appropriate circumstances and the second waveguide in others. For example, in some cases, the first waveguide may be coupled to a laser light source such as the laser light source 510 for a first period of time, and thereafter, the second waveguide may be coupled to the laser light source 510 for a second period of time. In these examples, an analyte can be identified and/or characterized based on which waveguide couples light into the analyte sample 506.

As with other embodiments, the laser light source 510 can receive power from a power source 512, which in turn may be controlled by control electronics such as the control electronics 514. In addition, the control electronics 514 can be coupled to one or more photodiodes in turn optically coupled to an output of one or more of the waveguides of the variable mode confinement waveguide array 504. The photodiodes, depicted as the photodiode array 516, can be coupled to the variable mode confinement waveguide array 504 via the photonic routing network 508 or, in other cases, may be coupled directly to an output facet associated with the variable mode confinement waveguide array 504.

As described above, the photodiodes of the photodiode array 516 can be used to determine absorption information in respect of the analyte sample 506. For example, if a first waveguide of the variable mode confinement waveguide array 504 is selected by the photonic routing network 508 and substantially no light is absorbed as detected by at least one photodiode of the photodiode array 516, the electronic device 500 may determine that the analyte sample 506 did not optically couple with the first waveguide. In other words, the first waveguide tightly confined light from the laser light source 510 within itself. In this manner, the electronic device 500 may determine that the analyte sample 506 does not exhibit the index of refraction range associated with the first waveguide. Alternatively, if light is absorbed by the analyte sample 506, the photodiodes may be used to determine an absorption spectrum which in turn can be used to infer properties of the analyte, such as solvents, solutes, components, and so on.

It may be appreciated that these foregoing embodiments depicted in FIG. 5 and the various alternatives thereof and variations thereto are presented, generally, for purposes of explanation, and to facilitate an understanding of various configurations and constructions of an electronic device that can incorporate a waveguide and/or photonic element for microfluidic analysis, such as described herein. However, it will be apparent to one skilled in the art that some of the specific details presented herein may not be required in order to practice a particular described embodiment, or an equivalent thereof.

Figure 6:
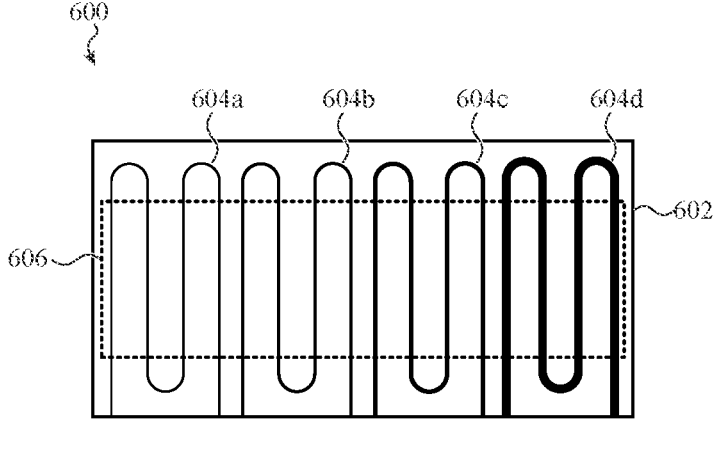
FIG. 6 is a simplified schematic diagram of a set of waveguides each exhibiting different region-specific and index-dependent mode confinement.

For example, it may be appreciated that waveguides of different width can be disposed in a number of suitable ways and may follow a number of suitable paths. For example, FIG. 6 is a simplified schematic diagram of a set of waveguides 600 each exhibiting different region-specific and index-dependent mode confinement. In particular, four serpentine waveguides are disposed on a substrate 602, each of which has a different width. For example, a first waveguide 604a may have a smaller width than a second waveguide 604b which in turn may be smaller in width than a third waveguide 604c and so on. As may be appreciated in view of other embodiments described herein, a large width waveguide 604d may couple into different materials than the first, second or third waveguides. In some cases, each of the waveguides may be formed from the same material but this is not required of all embodiments.

Further, in some cases, cladding thickness can define modal confinement properties. For example, in some embodiments turn regions of the waveguides can be disposed/defined below thicker cladding so that losses through turns are minimized. In another phrasing, cladding in a central region 606 can be of reduced thickness so that only analytes placed within the central region 606 may be able to couple to an appropriately shaped waveguide.

Figure 7:
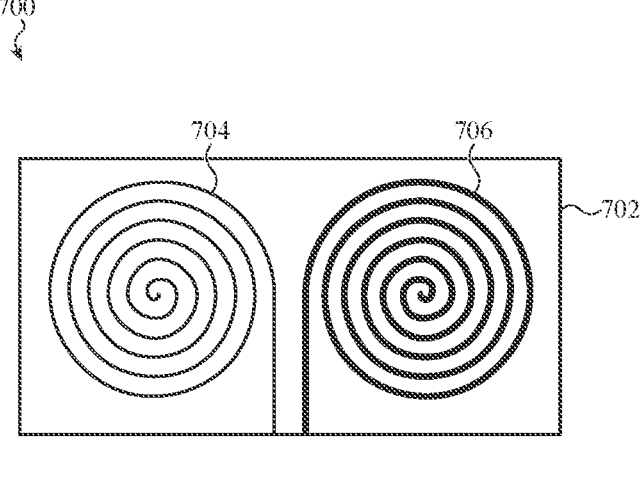
FIG. 7 is a simplified schematic diagram of another set of waveguides each exhibiting different region-specific and index-dependent mode confinement.

The depicted serpentine waveguides are merely examples; in other cases, serpentine paths may not be required. FIG. 7 is a simplified schematic diagram of another set of waveguides each exhibiting different region-specific and index-dependent mode confinement. In particular the set of waveguides 700 can be disposed on a substrate 702. In this example, a first waveguide 704 and a second waveguide 706 may each follow a spiral path. In these examples, the waveguides may not form a closed loop, although this is merely one example construction.

It may be appreciated that these foregoing embodiments depicted in FIGS. 6-7 and the various alternatives thereof and variations thereto are presented, generally, for purposes of explanation, and to facilitate an understanding of various configurations and constructions of a substrate hosting a set or array of waveguides and/or photonic elements, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figures 8A, 8B, 8C, 8D:
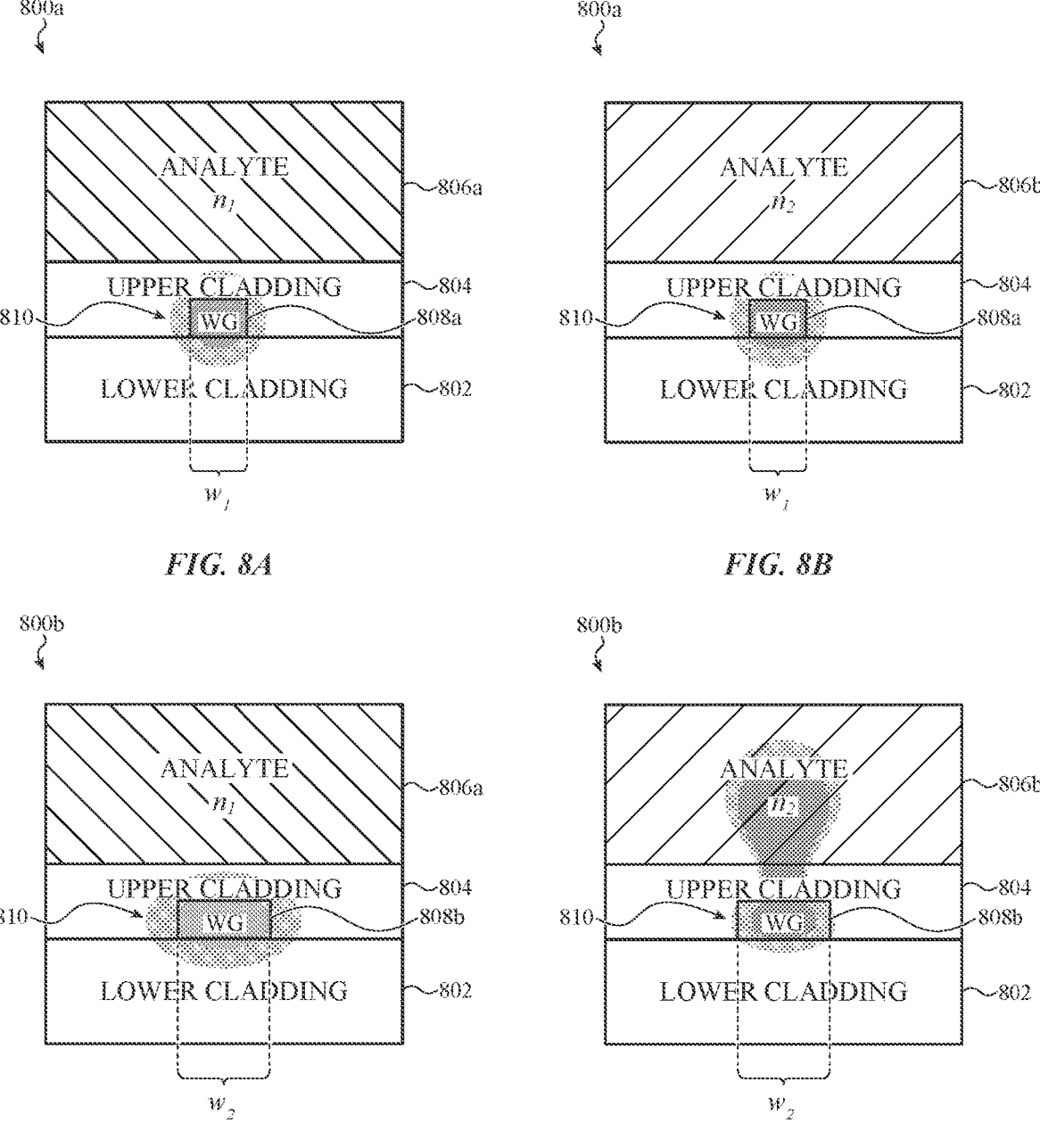
FIGS. 8A-8B depict a first schematic cross section of a waveguide section having width $w_1$ confining modes and not coupling into analytes of differing indices of refraction, effectively not interacting with either depicted analyte.
FIGS. 8C-8D depict a second schematic cross section of a waveguide section having width $w_2$ coupling into only certain analytes having particular indices of refraction, effectively not interacting with other analytes of other indices of refraction.

For example, it may be appreciated that generally and broadly, different waveguide widths can be selected in order to couple into or to effectively ignore particular analytes. In this manner, an array of differently constructed waveguides can be formed on the same substrate and be used to interrogate different properties of different analytes. To illustrated this more clearly, FIGS. 8A-8D are provided. In particular, FIGS. 8A-8B depict a first schematic cross section of a waveguide section having width $w_1$ confining modes and not coupling into analytes of differing indices of refraction, effectively not interacting with either depicted analyte. FIGS. 8C-8D depict a second schematic cross section of a waveguide section having width $w_2$ coupling into only certain analytes having particular indices of refraction, effectively not interacting with other analytes of other indices of refraction.

FIG. 8A depicts a cross section of a microfluidic analysis device 800a in which a lower cladding 802, constructed from a dielectric material such as silicon dioxide, serves as a substrate onto which one or more waveguides can be disposed. Disposed over the lower cladding 802 is an upper cladding 804 that can encapsulate any waveguides disposed on the lower cladding 802. The upper cladding 804 also defines an interface surface that can host an analyte sample, such as the analyte sample 806a. In the illustrated embodiment, the analyte sample 806a has an index of refraction $n_1$. The figure also illustrates a waveguide 808a that has a width $w_1$. The combination of the width $w_1$, and the thickness of the upper cladding 804 above the waveguide 808a ensure that light within the waveguide 808a is confined. In other words, the combination of the geometry of the waveguide 808a and the upper cladding 804, when placed in proximity of the analyte sample 806a, confines light within the waveguide 808a. No light is coupled into the analyte sample 806a.

FIG. 8B depicts a cross section of the same microfluidic analysis device, the microfluidic analysis device 800a. In this illustration, only the analyte sample differs from FIG. 8A. Specifically, an analyte sample 806b, having an index of refraction of $n_2$, is disposed over the interface surface defined by the upper cladding 804. As with the embodiment shown in FIG. 8A, the width $w_1$ of the waveguide 808a together with the thickness of the portion of the upper cladding 804 above the waveguide 808a, ensures tight mode confinement of light within the waveguide. No light is coupled into the second analyte sample.

FIG. 8C depicts a cross section of a different microfluidic analysis device, the microfluidic device 800b. In this illustration, the analyte sample 806a of FIG. 8A may be placed over the upper cladding 804. However, in this illustration, a waveguide 808b is disposed with a greater width, width $w_2$, than the waveguide 808a as shown in FIGS. 8A-8B. Despite the differing width, light within the waveguide 808b remains confined within the waveguide 808b and does not couple into an analyte having an index of refraction $n_1$.

FIG. 8D, however, presents a different embodiment in which the index of refraction $n_2$ of the analyte sample 806b works with the width $w_2$ and the cladding depth above the waveguide 808b so that light within the waveguide 808b effectively couples into the analyte sample 806b.

It may be appreciated that these foregoing embodiments depicted in FIGS. 8A-8D and the various alternatives thereof and variations thereto are presented, generally, for purposes of explanation, and to facilitate an understanding of variable mode confinement properties exhibited by the same photonic elements given proximity to different materials having different indices of refraction. However, it will be apparent to one skilled in the art that some of the specific details presented herein may not be required in order to practice a particular described embodiment, or an equivalent thereof.

Further, it may be appreciated that a waveguide having a particular designed width (and/or multiple widths configured to confine light in certain conditions and to not confine light in other conditions) as described herein can be manufactured in a number of suitable ways. FIGS. 9A-9M depict sequential cross sections corresponding to intermediate steps of manufacturing an example simplified photonic integrated circuit, exhibiting region-specific and index-dependent mode confinement as described herein.

Figure 9A:
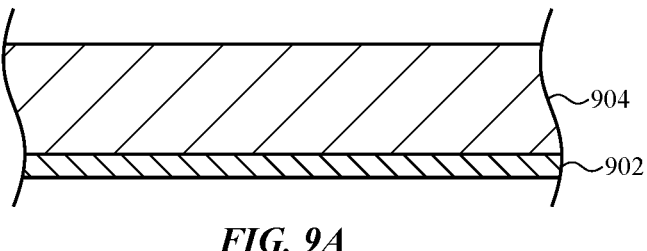

FIG. 9A depicts a manufacturing step in which bulk silicon, identified as the silicon wafer 902 is subjected to conditions inducing growth of an oxide layer 904. The oxide layer 904 can be formed from silicon dioxide, and may be or include a thermal oxide layer extending for a designed or targeted threshold distance into the bulk silicon of the silicon wafer 902. In other cases, a dielectric layer such as the oxide layer 904 can be deposited onto the silicon wafer 902, such as by vapor deposition, sputtering, or other similar methods.

Figure 9B:
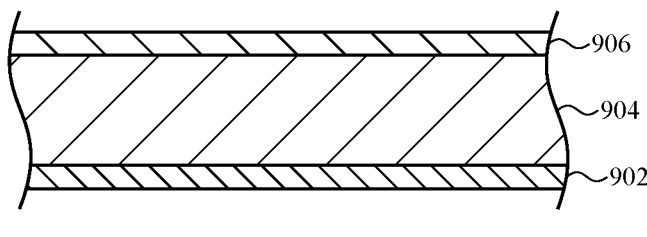

FIG. 9B depicts a cross section of the preceding structure in which a waveguide material layer 906 is disposed over the oxide layer 904. The waveguide material layer 906 can be disposed by (low pressure) chemical vapor deposition, sputtering, or another suitable technique. Different embodiments require different materials for the waveguide material layer 906 but in many examples SiN may be suitable. The thickness of the waveguide material layer 906 is selected specifically for desirable confinement properties once manufacturing of the waveguide completes.

Figure 9C:
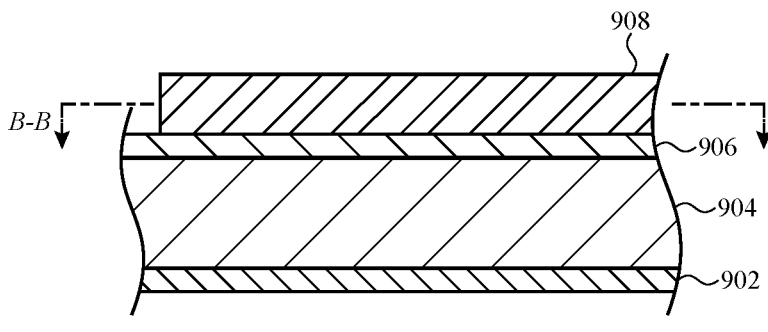

FIG. 9C depicts a cross section of the preceding structure in which a mask layer 908 is disposed over the waveguide material layer 906 so as to pattern the waveguide material layer 906 into a suitable pattern having a selected width selected specifically for desirable confinement properties once manufacturing of the waveguide completes.

Figure 9D:
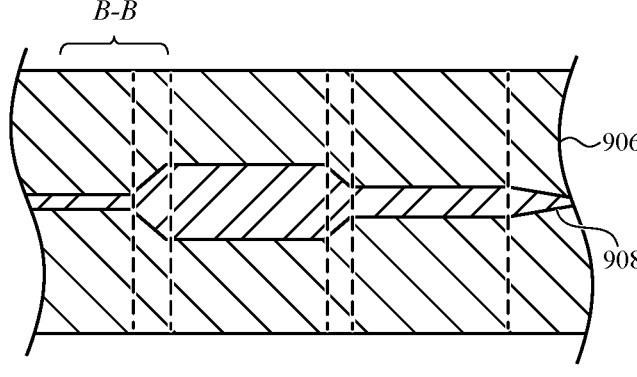

As an example, FIG. 9D depicts a view through line B-B of FIG. 9C to illustrate a pattern that may be suitable for the waveguide in some embodiments. FIG. 9D depicts the mask layer 908 disposed in a linear pattern, with thicker regions, thinner regions, and transitions therebetween. From the left of the figure to the right of the figure may be defined an interaction region (situationally dependent confinement), a taper, a transition region (high confinement), a tapered region, a routing region, and an input/output taper. One may appreciate that this example is intentionally simplified and not drawn to scale for the limited purpose of illustration and description.

Figure 9E:
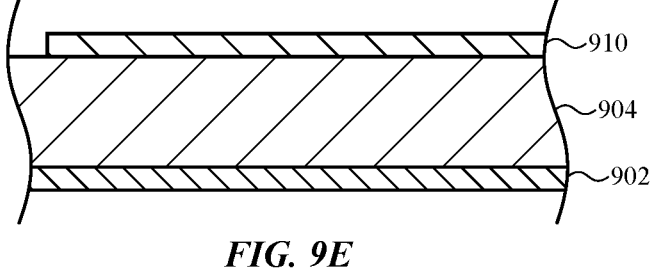

FIG. 9E depicts a cross section of the preceding structure in which an etching process patterns the waveguide material layer 906 into a patterned waveguide 910. In some examples, the patterned waveguide 910 is etched by reactive ion etching or by chemical etching processes. In many cases, an etching process is anisotropic so that edges of the patterned waveguide 910 are smooth. Once etched, residual photoresist or other material defining the mask layer 908 can be removed and exposed surfaces can be cleaned and/or polished.

Figure 9F:
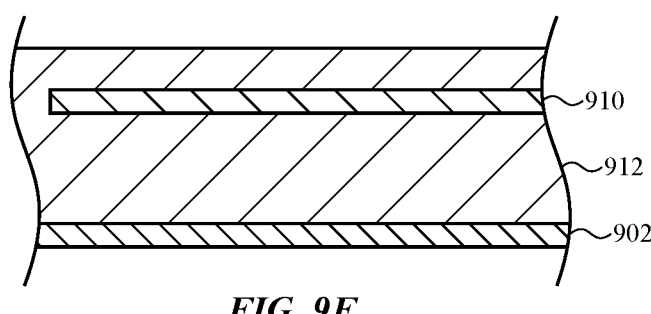

FIG. 9F depicts a cross section of the preceding structure in which an oxide layer is grown and/or disposed over the patterned waveguide 910. The oxide layer extends from and bonds to the oxide layer 904, forming a contiguous cladding, illustrated as the cladding 912. The cladding 912 can be formed to a suitable thickness above the patterned waveguide 910. This thickness may define, at least in part, confinement behavior of the patterned waveguide 910 such as described above. As with other embodiments described herein, the cladding 912 can be disposed in any suitable manner including vapor deposition or sputtering.

Figure 9G:
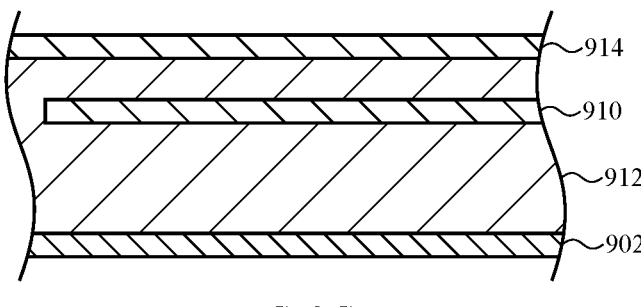

FIG. 9G depicts a cross section of the preceding structure in which a sacrificial layer 914 is disposed. The sacrificial layer 914 serves as an etch stop layer in respect of the cladding 912 and can be formed of any suitable material that is soluble in a solvent that does not dissolve the material of the cladding 912. More generally, the sacrificial layer 914 can be formed from any suitable material with high selectivity to oxide etches. Example suitable materials include SiN, Ti, TiN, Al, Au, W, or any other suitable metal or metal oxide or metal nitride. These materials are not exhaustive, and other sacrificial/etch stop materials may be used in other embodiments. The material of the sacrificial layer 914 can be deposited in any suitable manner including (low pressure) chemical vapor deposition, sputtering, atomic layer deposition, and the like.

FIG. 9H depicts a cross section of the preceding structure in which a mask layer, identified as the mask layer 916, is disposed over the sacrificial layer 914. The mask layer 916 can have the same or a different pattern than the mask layer 908 illustrated in FIGS. 9C-9D. Thereafter the sacrificial layer 914 can be etched using a material-suitable process. Once etched, the sacrificial layer 914 may be a patterned sacrificial layer 918 as shown in FIG. 9I. After etching, remaining photoresist or other material can be removed (and, as necessary, cleaned and/or polished) such as shown in FIG. 9I.

FIG. 9J depicts a cross section of the preceding structure in which another oxide layer is grown and/or disposed over the patterned sacrificial layer 918. The oxide layer extends from and bonds to the cladding 912, forming a contiguous cladding, illustrated as the cladding 920. The cladding 920 can be formed to a suitable thickness above the patterned sacrificial layer 918. This thickness may define, at least in part, confinement behavior of portions of the patterned waveguide 910, such as described above. As with other embodiments described herein, the cladding 920 can be disposed in any suitable manner including vapor deposition or sputtering.

Figure 9K:
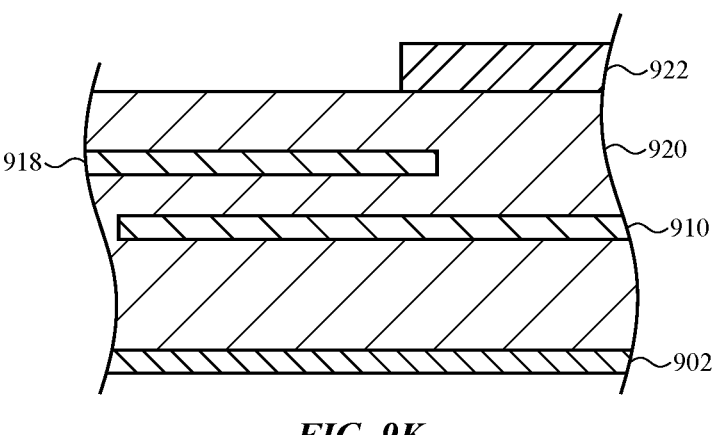
Figure 9L:
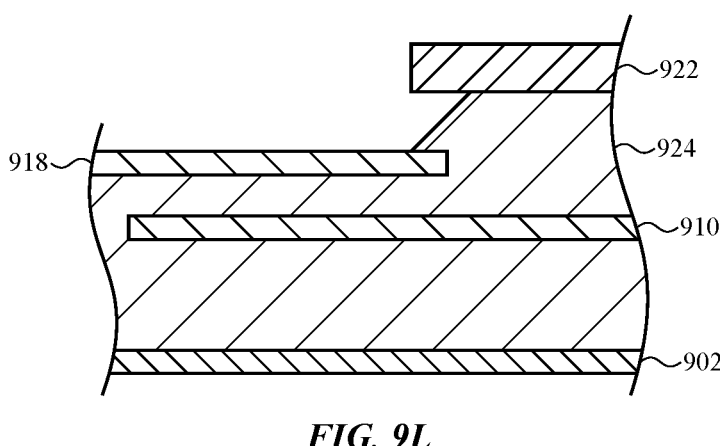
Figure 9M:
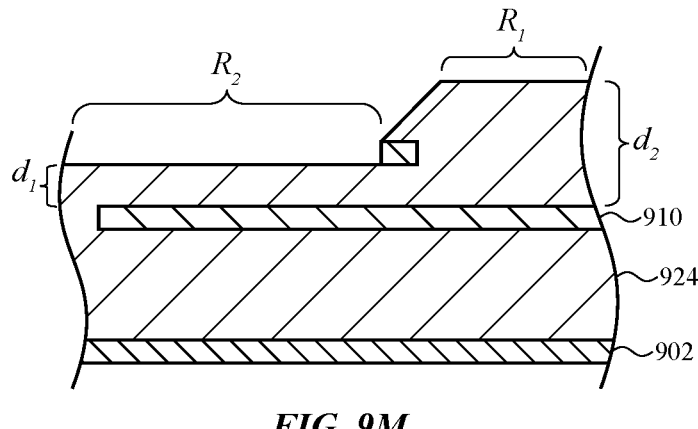

FIG. 9K depicts a cross section of the preceding structure in which another mask layer, a mask layer 922, is disposed over the cladding 920. The mask layer 922 can partially overlap the patterned sacrificial layer 918 so that when the cladding 920 is later etched such as shown in FIG. 9L, a resulting edged cladding which is identified as the multi-thickness cladding 924, does not inadvertently etch below the depth defined by an upper surface of the patterned sacrificial layer 918, thereby ensuring that when the mask layer 922 is removed and the patterned sacrificial layer 918 (e.g., such as shown in FIG. 9M) is etched away, that a smooth transition exists between different regions of the resulting photonic structure. In particular, a region $R_1$ may be a thicker region of the cladding 924 than a second region $R_2$. In this construction, the second region $R_2$ can have a thin cladding over the patterned waveguide 910 having a depth or thickness of $d_1$, compared to the thicker depth or thickness of the first region $R_1$ which is identified in FIG. 9M as $d_2$. In this construction, light may be confined in $R_1$ regardless of nearby analytes or objects, whereas light may be loosely confined in $R_2$ in circumstances and highly confined in other circumstances. In some embodiments, all of the cladding above waveguide 910 may be removed entirely in the $R_2$ region to promote higher coupling with analytes.

It may be appreciated that these foregoing embodiments depicted in FIGS. 9A-9M and the various alternatives thereof and variations thereto are presented, generally, for purposes of explanation, and to facilitate an understanding of methods of manufacturing a waveguide having a specific thickness, width, and cladding thickness, such as described herein. However, it will be apparent to one skilled in the art that some of the specific details presented herein may not be required in order to practice a particular described embodiment or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIG. 10 is a flowchart depicting example operations of a method of manufacturing a photonic integrated circuit, such as described herein. The method 1000 can be implemented in a number of suitable ways, as may be appreciated by a person of ordinary skill in the art.

The method 1000 includes operation 1002, which may correspond in general to the cross section as shown in FIG. 9A, in which a starting/base wafer is selected. The wafer may be a semiconductor wafer, such as bulk silicon, or may be another wafer material. In some cases, the wafer may include a thermal oxide layer along a surface thereof although this is not a requirement of all embodiments.

The method 1000 also includes operation 1004 at which one or more waveguides such as described herein can be formed using suitable combinations of manufacturing steps. Examples can include photolithography and etching suitable to ensure smooth transitions and smooth sidewalls able to transit light from an input facet to an output facet with minimal path losses or internal refraction.

The method 1000 also includes operation 1006 at which a cladding layer may be disposed and/or formed over the waveguides formed at operation 1004. The cladding can be formed to a desired thickness and/or to a set of desired thicknesses in different regions. For example, thicker cladding (such as region $R_2$ shown in FIG. 9M) may be preferred in regions in which high confinement is required. An example region in which high confinement may be desirable would be a transition region or a loopback region including a curve for light to follow within the waveguide (see e.g., curved serpentine waveguides of FIG. 1 or FIG. 6).

In other regions the cladding thickness may be selected so as to exhibit loose confinement when positioned adjacent to materials of particular refractive indices. In other cases, or in an opposite phrasing, the cladding thickness maybe thinned so as to exhibit loose confinement in circumstances except those when placed adjacent to a material within a particular index of refraction range (i.e., above a characteristic threshold). In these cases, the material wetting to the interface surface defined by the cladding may induce total internal reflection and/or increase internal reflection so that confinement within the waveguide increases. In such examples, loose confinement may be experienced without material on the interface surface and/or with materials of a particular index of refraction positioned on the interface surface.

FIG. 11 is a flowchart depicting example operations of a method of operating an electronic device as described herein to perform microfluidic analysis of an analyte. As with other methods described herein, the method 1100 can be performed in a number of suitable ways and may include a greater number or a lower number of operations or a different order of operations in some examples.

The method 1100 includes operation 1102 at which an analyte sample is positioned on an interface surface, which may be referred to as an analysis surface. Next at operation 1104, a waveguide may be selected by control electronics controlling a photonic routing network, such as shown and described in reference to FIG. 5. Once a waveguide is selected, and an optical path is defined between a laser light source and the selected waveguide, laser light can be provided as input to the waveguide.

Next at operation 1106, an output facet of the waveguide can be studied (e.g., by monitoring power output from a photodiode monitoring an MZI or other interferometer branch coupled to (1) the output facet, and (2) to reference light. In this manner, an absorption spectrum of the analyte can be determined. If the analyte does not absorb any light, the method may determine that the analyte exhibits an index of refraction incompatible with coupling to the selected waveguide. Alternatively, if the analyte does absorb some of the light provided as input to the waveguide, the method may determine that the analyte has interacted with the light and in what manner. At operation 1106, any interaction with the light can be characterized.

At operation 1108, the interaction observed can be correlated to a material property or other analyte characteristic. For example, one or more compounds can be identified by comparing known absorption spectra with the observed absorption spectrum.

In some cases, the method 1100 may return to operation 1104 at which a different waveguide is selected so that different materials having different indices of refraction can be studied. In other cases, the method 1100 can return to operation 1106 at which different laser light may be applied through the same waveguide in order to determine different absorption spectra indicating presence or absence of different materials, elements, compounds, properties, or other characteristics.

FIG. 12 is a flowchart depicting example operations of a method of operating an electronic device as described herein to impart optical power into an object or analyte. The method 1200 includes operation 1202 at which an analyte is selected for analysis. The analyte may be placed on an analysis surface or interface surface above a waveguide array as described herein (see, e.g., FIG. 5). At operation 1204, a first frequency of single frequency laser light may be selected to illuminate the object/analyte. The frequency may be selected to test absorption of the analyte at or near that frequency. Next, at operation 1206 a particular waveguide can be selected that is known to loosely couple when in the presence of a material having the index of refraction exhibited by the analyte sample selected at operation 1202. Thereafter, at operation 1208, the selected waveguide can be provided with light at the selected frequency so as to illuminate the analyte in the desired manner. Thereafter, as described in respect of other embodiments, an absorption spectrum can be determined to obtain information about the analyte sample and its contents or, in other cases, what the analyte does not contain.

It may be appreciated that these foregoing embodiments depicted in FIGS. 10-12 and the various alternatives thereof and variations thereto are presented, generally, for purposes of explanation, and to facilitate an understanding of methods of manufacturing a waveguide and operating a system including a waveguide having a specific thickness, width, and cladding thickness, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various example embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the embodiments described above but is instead defined by the claims herein presented.

A photonic circuit or optical circuit such as described herein can be incorporated into any suitable computing device or computing resource. As used herein, the term "computing resource" (along with other similar terms and phrases including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single- or multi-core processors; single- or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A photonic circuit comprising:

an insulator layer;

a waveguide formed on the insulator layer to a selected thickness and defining a path from an input to an output, the waveguide defining:

a first region having a first width selected for high confinement of light; and a second region having a second width less than the first width, the second width selected for:

high confinement of light given a first condition; and loose confinement of light given a second condition; and a cladding layer formed over the waveguide, encapsulating the waveguide and disposed to a first thickness over the first region of the waveguide and a second thickness less than the first thickness over the second region of the waveguide, wherein:

the cladding layer defines an interface surface configured to receive a first analyte and a second analyte;

the first condition corresponds to the first analyte being positioned on the interface surface; and the second condition corresponds to the second analyte being positioned on the interface surface.

2. The photonic circuit of claim 1, wherein the waveguide is formed from silicon nitride and the cladding layer comprises silicon dioxide.

3. The photonic circuit of claim 1, wherein:

the first analyte has a first index of refraction; and the second analyte has a second index of refraction different from the first index of refraction.

4. The photonic circuit of claim 3, wherein the second width and the second thickness are selected to exhibit loose confinement when the interface surface contacts a material with the second index of refraction.

5. The photonic circuit of claim 3, wherein the first index of refraction is lower than the second index of refraction.

6. The photonic circuit of claim 3, wherein:

the second index of refraction is that of human hair; and the first index of refraction is one of:

skin;

air;

water; or shaving lubricant.

7. The photonic circuit of claim 1, comprising an input facet optically coupled to the input of the waveguide, the input facet configured to optically couple to one of a photonic routing circuit or a laser light source.

8. The photonic circuit of claim 1, wherein the waveguide has a serpentine path.

9. An electronic device comprising:

a laser light source;

a power source coupled to the laser light source;

control electronics coupled to the power source and to the laser light source; and a photonic circuit comprising:

a waveguide optically coupled to the laser light source, the waveguide defining:

a first region having a first width selected for high confinement of light; and a second region having a second width less than the first width, the second width selected for:

high confinement of light given a first condition; and loose confinement of light given a second condition; and a cladding layer formed over the waveguide, encapsulating the waveguide and disposed to a first thickness over the first region of the waveguide and a second thickness less than the first thickness over the second region of the waveguide, the cladding layer defining an interface surface above the second region of the waveguide, wherein:

the first condition corresponds to a first material having a first index of refraction placed proximate to the interface surface; and the second condition corresponds to a second material having a second index of refraction placed proximate to the interface surface, the second index of refraction different from the first index of refraction.

10. The electronic device of claim 9, wherein:
the second material is human hair; and
the first material is one of:
   skin;
   air;
   water; or
   shave lubricant.

11. The electronic device of claim 10, wherein the control electronics are configured to cause the power source to power the laser light source to emit a single frequency of laser light into the waveguide, the single frequency overlapping an absorption spectrum of a chromophore within human hair.

12. The electronic device of claim 11, wherein output of the laser light source is configured to fracture human hair.

13. The electronic device of claim 9, wherein the first material is a first analyte and the second material is a second analyte.

14. The electronic device of claim 13, wherein the control electronics are configured to cause the power source to power the laser light source to emit a single frequency of laser light into the waveguide, the single frequency overlapping an absorption spectrum of a compound within the second analyte.

15. The electronic device of claim 9, comprising a housing enclosing the power source, the control electronics, the laser light source, and the photonic circuit.

\* \* \* \* \*